Figure 1:
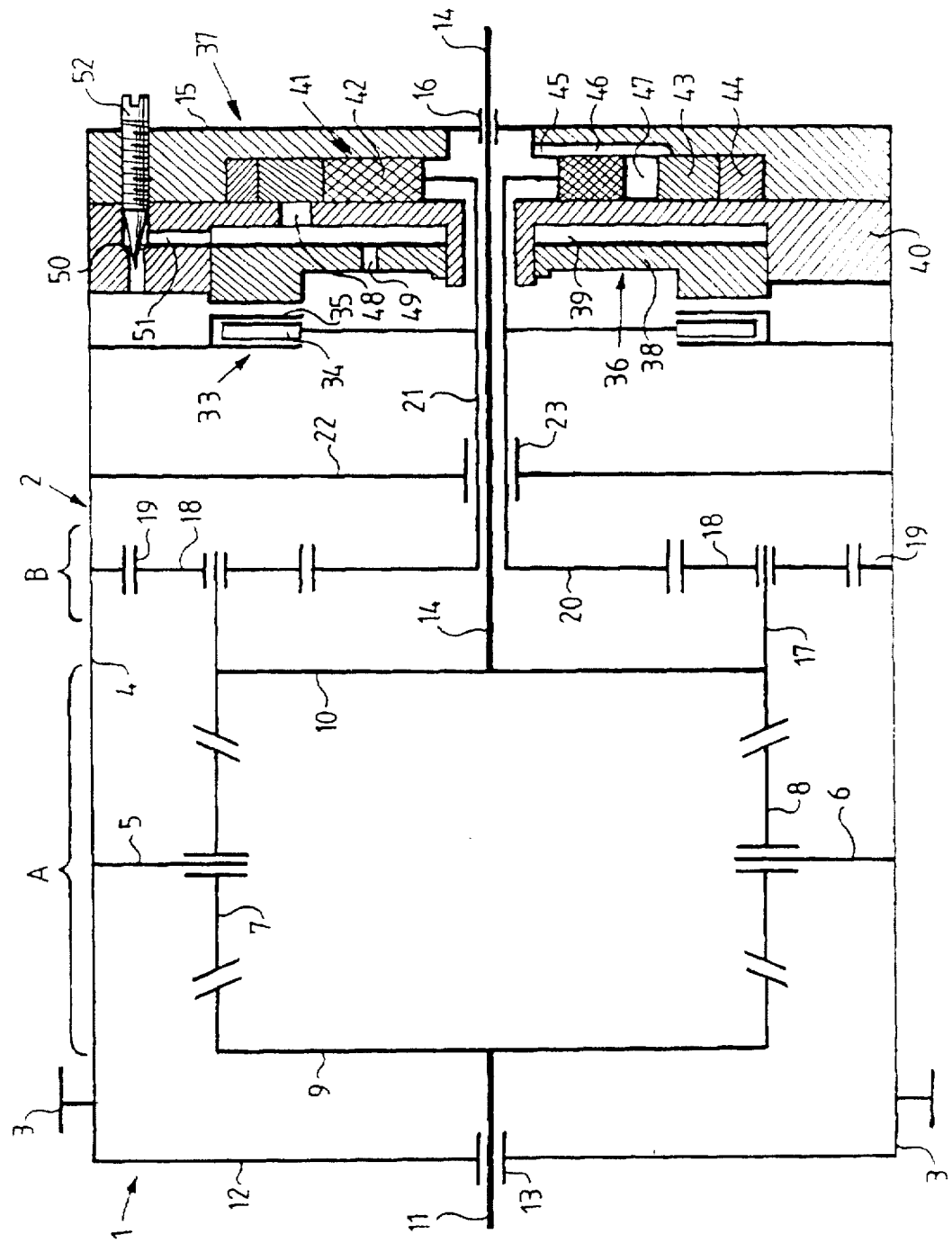

United States Patent [19]

Perry

[11] Patent Number: 5,785,622
[45] Date of Patent: Jul. 28, 1998

[54] DIFFERENTIAL GEAR

[75] Inventor: Forbes George de Brie Perry, Charlbury, Great Britain

[73] Assignee: Slim Borgudd, Coventry, Great Britain

[21] Appl. No.: 687,405

[22] PCT Filed: Feb. 2, 1995

[86] PCT No.: PCT/SE95/00101

§ 371 Date: Aug. 2, 1996

§ 102(e) Date: Aug. 2, 1996

[87] PCT Pub. No.: WO95/21342

PCT Pub. Date: Aug. 10, 1995

[30]    Foreign Application Priority Data

Feb. 2, 1994 [SE] Sweden .................. 9400336

[51] Int. Cl.[6] .................................. F16H 48/20
[52] U.S. Cl. .................. 475/84; 475/221; 475/89
[58] Field of Search ................. 475/84, 86, 88, 475/89, 90, 93, 101, 219, 220, 221

[56]    References Cited

U.S. PATENT DOCUMENTS

| 2,808,739 | 10/1957 | Mueller | 475/89 |
| 3,015,970 | 1/1962 | Mueller | 475/89 |
| 3,590,954 | 7/1971 | Plantan | 475/89 |
| 4,012,968 | 3/1977 | Kelbel | 475/84 X |
| 5,176,589 | 1/1993 | Borgudd | 475/221 |
| 5,655,983 | 8/1997 | Dick | 475/89 X |

FOREIGN PATENT DOCUMENTS

| 0267953 | 5/1988 | European Pat. Off. . | |
| 470 287 | 1/1994 | Sweden . | |
| 1620338 | 1/1991 | U.S.S.R. | 475/84 |
| 1662880 | 7/1991 | U.S.S.R. | 475/84 |
| 8706668 | 11/1987 | WIPO | 475/89 |
| WO87/07348 | 12/1987 | WIPO . | |

*Primary Examiner*—Khoi Q. Ta
*Attorney, Agent, or Firm*—Jacobson, Price, Holman & Stern, PLLC

[57]    ABSTRACT

A differential gear includes a rotatable housing, a first output shaft connected to a first gear element and a second output shaft connected to a second gear element of a differential planet gear train disposed within the housing and having further gear elements attached to the housing. A planet gear train is disposed within the housing and has a ring gear attached to the housing, a planet wheel connected to the ring gear and a sun wheel connected to the planet wheel. The sun wheel is connected to a hollow shaft having the second output shaft disposed therein. A fluid pump having a first member rotatable with the hollow shaft and a second member rotatable relative to the first member is disposed between the housing and the hollow shaft for braking relative rotation between the housing and the hollow shaft in response to a difference in rotational speed between the first and the second output shaft.

7 Claims, 3 Drawing Sheets

DIFFERENTIAL GEAR

The present invention relates to a differential drive apparatus having an input member and two output members.

It is known, especially in wheel driven vehicles, to introduce an unequal torque division between the output members of a differential drive apparatus by applying braking torque to one of the output members. Conventional limited slip differential drive apparatuses are of two types, namely those which are sensitive to differences in torque of the output members and those which are sensitive to differences in rotational speed of the output members. The torque transferred across conventional differential drive apparatuses is equal to that carried by the brake, and the braking energy is extracted from the system and wasted.

One object of the present invention is to provide a differential apparatus of the type transferring torque between the output members primarily as a function of their speed differential and wherein:

a) braking energy is recirculated instead of wasted;
b) torque applied by the brake is augmented when transfer occurs between the output members. For a given transfer of torque this leads to lighter and more responsive power handling by the brake;
c) the speed of the braked member is increased relative to the difference in speeds of the output members. This increases the sensitivity of the system with respect to differences in speed of the output members; and wherein
e) adjustment of the relationship between output member differential speeds and the amount of torque transferred is enabled without dismantling the apparatus.

These objects are achieved in a differential gear of the kind described in WO 87/07348 (EP-B1-0 267 953; U.S. Pat. No. 5,176,589) and comprising a differential gear housing driveable for rotation, a first output shaft operatively connected to a first gear element and a second output shaft output shaft operatively connected to a second gear element of a differential planet gear disposed within the differential gear housing, said differential planet gear having further gear elements attached to the differential gear housing, and a planet gear disposed within the differential gear housing and having a ring gear attached to the differential gear housing, at least one planet wheel operatively connected to the ring gear and a sun wheel operatively connected to the planet wheel, said sun wheel being connected to a hollow shaft having the second output shaft disposed therein, brake means being disposed between the differential gear housing and said hollow shaft for braking relative rotation between the differential gear housing and the hollow shaft. In the differential gear according to the present invention, the brake means is operable in response to a difference in rotational speeds between the first and the second output shaft. According to the present invention, the brake means includes a fluid pump having mutually rotatable members, one member rotating with the hollow shaft and one with the differential gear housing.

In a first embodiment of the present invention said means further includes a control brake mechanism operable by fluid pressure generated by the pump.

In a second embodiment of the present invention, said means comprises solely the pump. In this case, the braking effect of the pump depends on fluid counterpressure from the pump delivery modified by possible leakage and flow restrictions.

Figure 2:
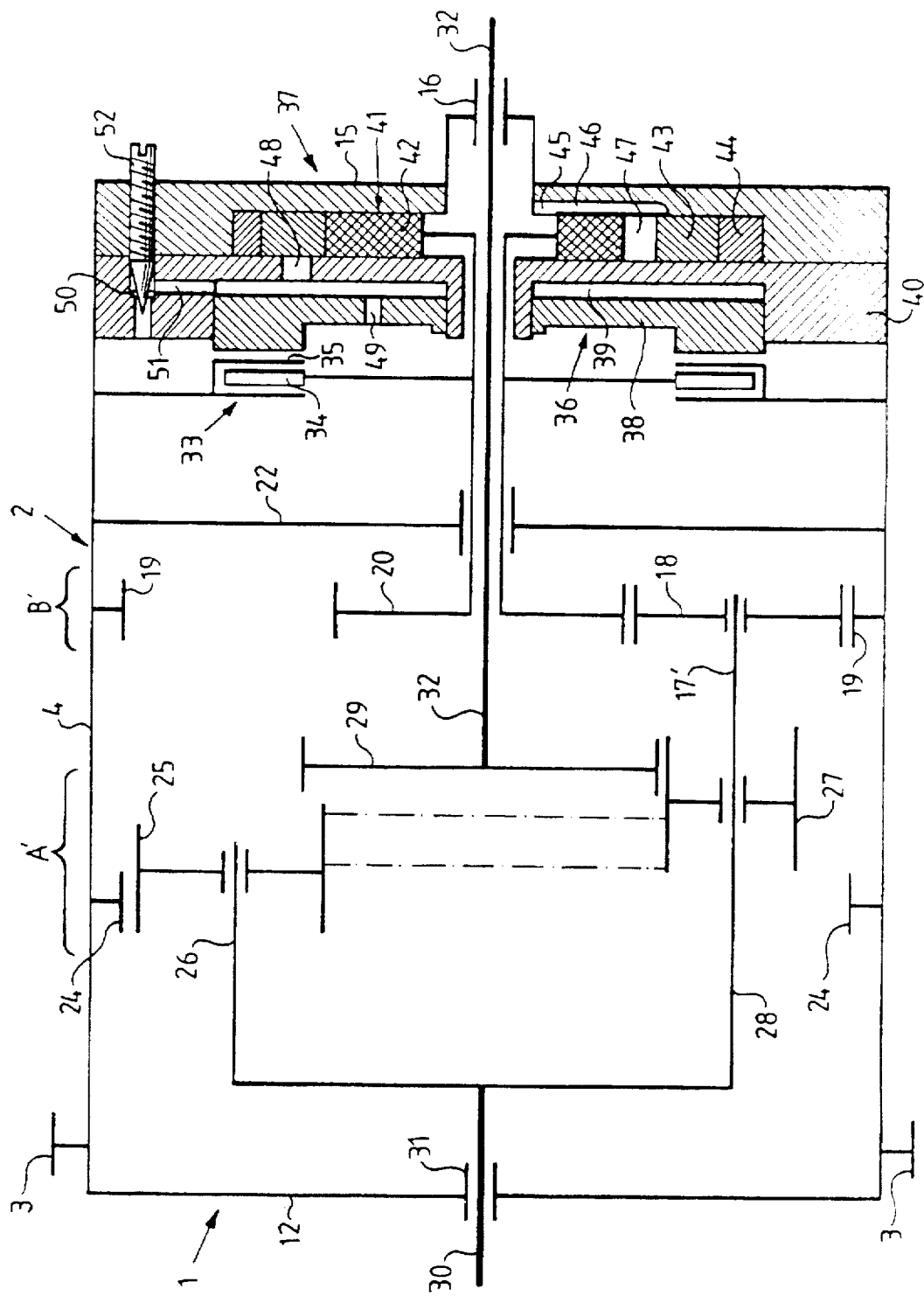
Figure 3:
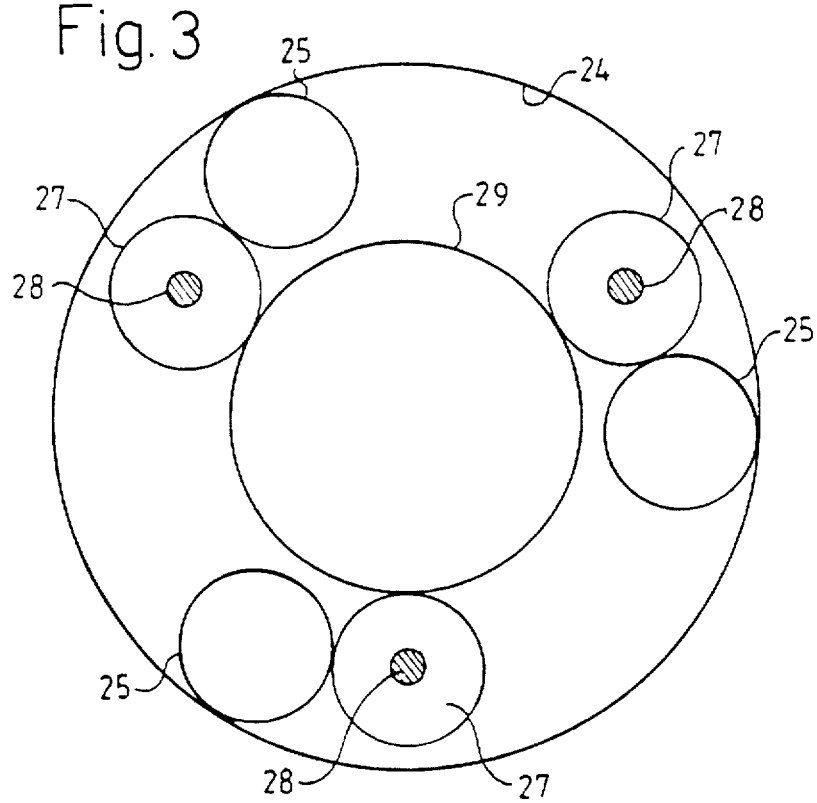
Figure 4:
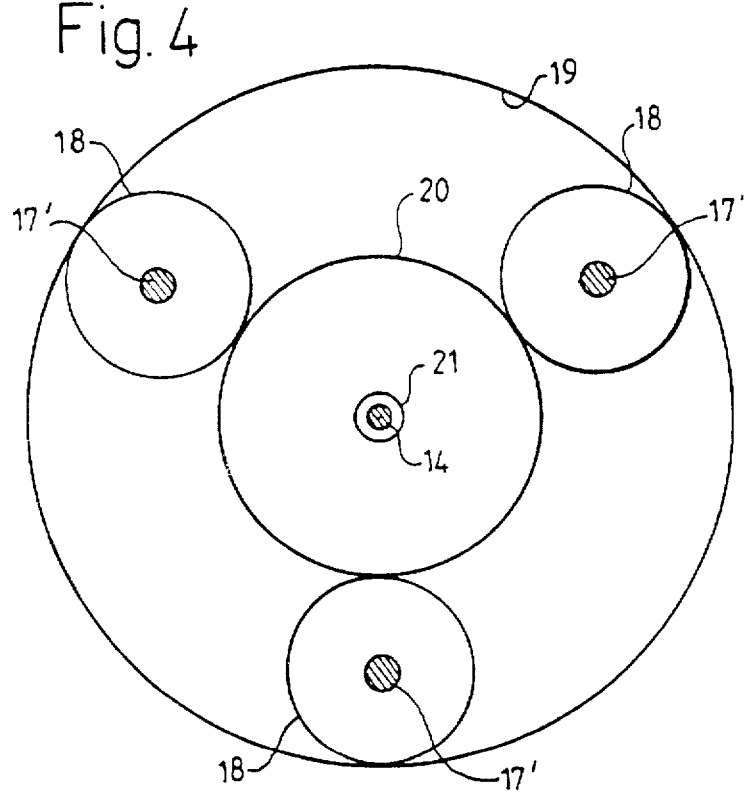

The present invention will now be described more in detail, reference being made to the accompanying drawings, wherein:

FIG. 1 is a schematic representation of a differential gear utilizing bevelled gears in its differential planet gear, FIG. 2 is a schematic representation of a differential gear utilizing epicyclic gears in its differential planet gear, FIG. 3 is an axial schematic view of gear train A' seen from the left in FIG. 2 but showing the gear elements thereof at another relative scale, and FIG. 4 is an axial schematic view of gear train B' as seen from the right in FIG. 2.

In FIGS. 1 and 2, reference numeral 1 a differential gear having a housing, or, crown wheel casing 2. The housing 2 is driveable for rotation by means of a crown wheel 3 meshing with a drive pinion not shown.

The differential gear shown in FIG. 1 is one embodiment of the gear described in the above-mentioned patent and includes a differential planet gear train A and an ordinary planet gear train B. At an inner circumferential wall 4 of the housing 2 is fixedly arranged a plurality of radial shafts, two such shafts 5 and 6 being shown. These shafts rotatably carry idling differential planet wheels 7 and 8, respectively, meshing with a first and a second side wheel 9 and 10, respectively, of the differential planet gear train A. The first side wheel 9 is fixedly carried by a first output shaft 11. The shaft 11 extends through an end wall 12 of the housing and is journalled in a bearing means 13 attached thereto, and the second side wheel 10 is fixedly attached to a second output shaft 14, which is axially aligned with the first output shaft 11 and extends through an end wall 15 of the housing opposite to end wall 12 and is journalled in a bearing means 16.

The second side wheel 10 is adapted as a holder for planet wheels of planet gear train B. For that purpose, the side wheel 10 of differential planet gear train A is provided with at least one shaft 17 extending in the direction of output shaft 14 and substantially parallel thereto. The shaft 17 forms a planet wheel holder for an idling planet wheel 18 meshing with a ring wheel 19 fixedly attached to the inner wall 4 of the housing 2 and, consequently, rotating therewith. Meshing with the idling planet wheel 18 is the sun wheel 20 of planet gear train B, sun wheel 20 being attached to a hollow shaft 21 journalled in a mid-section wall 22 of the housing 2 by means of a bearing means 23. The hollow shaft 21 extends in the direction of the second output shaft 14 of differential planet gear train A, the second output shaft extending through hollow shaft 21.

The differential gear shown in FIG. 2 includes an epicyclic equivalent A' to differential planet gear train A and a planet gear train B' corresponding to that of FIG. 1. Epicyclic gear train A' includes a ring wheel 24 fixedly attached to the inner wall 4 of the housing 2 and, consequently, rotating therewith, at least one planet wheel 25 journalled on a planet wheel holder 26 and meshing with the ring wheel 24, at least one further idling planet wheel 27 journalled on a planet wheel holder 28 and meshing with a sun wheel 29 and also with planet wheel 25, as indicated by dash-dotted lines in FIG. 2 (see also FIG. 3). The planet wheel holders 26 and 28 are fixedly attached to and are rotatable with a first output shaft 30 journalled in the housing 2 by means of a bearing 31, and the sun wheel 29 is fixedly attached to and is rotatable with a second output shaft 32. An extension 17' of planet wheel holder 28 forms the planet wheel holder for planet wheel 18 of planet gear train B' (see also FIG. 4). As in FIG. 1, the second output shaft 32 extends through the hollow shaft 21 of planet gear train B'.

The meshing between planet wheels 25 and 27 is shown more clearly in FIG. 3 being an axial view of differential gear train A' seen from shaft 30 in FIG. 2 and showing three assemblies of intermeshing planet wheels 25, 27. For the sake of clarity, however, planet wheels 25 and 27 are shown in FIG. 3 being differently sized than in FIG. 2. Thus, in FIG. 3, the complete differential gear train A' is clearly visible, viz., intermeshing gears 24/25, 25/27 and 27/29.

FIG. 4 is an axial view of planet gear train B' seen from shafts 21 and 32 in FIG. 2 and showing three planet wheels 18 and their respective planet wheel holders 17', the latter being extensions of planet wheel holders 28.

As described in WO 87/07348, the hollow shaft 21 serves as a control shaft for the differential gear by being either rotatably driven or braked relative to the differential gear housing 2, the corresponding output shaft 14 or 32, or any fixed object such as a vehicle chassis.

According to the present invention, the hollow shaft 21, and thereby the sun wheel 20, is braked relative to the differential gear housing 2.

In the first embodiment of the present invention, to achieve such braking a control brake mechanism 33 is provided including a brake disc 34 fixedly attached to the hollow shaft 21 and a cooperating braking means 35, such as a braking surface or a brake pad, torsionally fixed to the housing 2. By applying a variable axial force upon the braking means 35 moving it towards the brake disc 35, a correspondingly variable braking effect on relative rotation between the hollow shaft 21 and the housing 2 may be obtained. In order to make the braking torque of control brake mechanism 33 effective, and to reduce the tangential force needed for a given braking torque, braking action between the brake disc 34 and the cooperating brake means 35 takes place at a radial distance from hollow shaft 21, as shown in FIGS. 1 and 2.

In practice, and as is well known in the art, it may be preferable to use as control brake mechanism a package of a plurality of discs, every other being attached to the hollow shaft 21 and every other to the housing 2, braking being achieved by axially pressing the discs together.

The variable braking effect is controlled in response to a difference in rotational speeds of the output shafts. When both output shafts 11 and 14 (FIG. 1) and 30 and 32 (FIG. 2) rotate at equal speeds, the differential gear housing 2 and the hollow shaft 21 rotate at the same speed as the output shafts. It follows that any difference in rotational speeds of the output shafts results in a difference in rotational speeds between the housing 2 and the hollow shaft 21.

According to the present invention, this last mentioned speed differential is utilized to apply a braking force to the braking means 35 acting on the braking disc 34 and thereby a braking torque to the hollow shaft 21.

To this end, the differential gear housing 2 is provided with a power means 36 operating the control brake mechansim 33 and control means 37 for controlling the power exerted by the power means 36 in relation to a difference in rotational speeds between the hollow shaft 21 and the housing 2.

The power means 36 comprises a fluid pressure operated piston 38 which is axially slidable in a cylinder 39 provided in an interior wall 40 of the housing 2. Axial movement of the piston 38 to the left in FIGS. 1 and 2 results in pressing the braking means 35 against the brake disc 34 and, thereby, in braking of the hollow shaft 21 relative to the housing 2 and, thus, in a motor vehicle application, to braking of an over-speeding wheel.

The control means 37 includes a fluid pump 41 providing fluid pressure to operate the piston 38. The pump 41 is accommodated in the end wall 15 of the housing 2, which, in the embodiment shown in FIGS. 1 and 2, is closely abutting the interior wall 40 and constitutes a pump casing for the pump 41. The pump could preferably be a commercially available eccentric pump (for instance a pump sold under the trade name GEROTOR by W. H. Nichols Company, Waltham, Mass., U.S.A.) including a radially inner pump-driving rotor 42 connected to the hollow shaft 21 for rotation therewith, an outer rotor 43, eccentric to the inner rotor 42, and an outermost eccentric ring 44 for eccentricity reversal. The pump is centrally fed with fluid through a pump inlet 45 which directs the fluid through a radial channel 46 to a space 47 defined between the inner rotor 42 and the outer rotor 43. Pressurized fluid is discharged from the pump through a non-shown pump outlet communicating through an aperture 48 provided in the interior wall 40 with the cylinder 39. A base orifice 49 is provided through the piston 38 to allow a predetermined bleeding through the piston.

The control means 37 further includes an orifice 50 in a channel 51 leading from the cylinder 39 to the interior of the gear housing. The area of the orifice 50 is adjustable by means of a valve stem 52 threaded in end wall 15. By rotating the threaded stem 52 from outside the housing 2, the area of the orifice 50 may be increased or decreased, thus enabling adjustment of the pressure acting on the piston 38, without dismantling the housing. Of course, there are alternatives to this mechanical method of adjusting the orifice 50 from outside the housing, such as electric or hydraulic actuations.

It is realized that rotation of the hollow shaft relative to the housing 2 will cause a fluid flow through the pump outlet and the aperture 48 into the cylinder 39. The fluid pressure will act on the surface of the piston 38 facing away from the brake mechanism 33 and force the piston to the left of FIGS. 1 and 2 to apply the braking means 35 against the brake disc 34.

The fluid utilized is conveniently and preferably lubricating fluid circulating in the lubrication system of the transmission with which the differential gear is associated. Thus, the fluid is taken from that system and returned thereto.

The direction of rotation of the inner rotor 42 depends on the direction of relative rotation of the two output shafts, but the direction of fluid flow from the pump 41 to the cylinder 39 is required to be always the same. This is achieved by changing the eccentricity of the outer pump rotor 43 by a 180°rotation of the outermost eccentric ring 44. This half revolution is caused by friction drag imposed on the eccentric ring by a spring loaded slider element (not shown) in the outer rotor 43. As the outer rotor rotates, it frictionally drags the eccentric ring with it until engagement with a stop pin attached in the housing 2, e.g., in the end wall 15.

In the second embodiment of the present invention, not particularly shown in the drawings, the means utilized to achieve braking of the hollow shaft 21 and the sun wheel 20 relative to the housing 2 is solely the pump 41 itself. In this embodiment, thus, the piston 38, the cylinder 39 and the control brake mechanism 33 could be dispensed with, and the aperture 48 would communicate directly with the channel 51. Braking torque on the hollow shaft 21 is raised, not mechanically as in the first embodiment, but hydraulically in that the hollow shaft torque has to drive the pump, i.e., the inner rotor 42, which is a braking torque as regards the hollow shaft, and this braking torque depends on fluid backpressure at the outlet of the pump resulting from fluid resistance through downstream restrictions, such as the aperture 48, the channel 51 and the orifice 50, as well as normal leakage.

The objects of the present invention as stated hereinbefore are accomplished as follows:

Object a)

The reaction of the braking torque on sun wheel 20 is felt by the shaft 17' (FIG. 2) of planet wheel 18 and is a torque transfer to output shaft 30 and at annulus gear mesh 18/19. There, the tangential force is in the same direction as the driving input at crown wheel 3 and, thus, returns to the input power. This is referred to as recirculating braking energy. The same action takes place in the embodiment of FIG. 1.

Object b)

The torque applied by the control brake mechanism 33, or, pump 41, goes to sun wheel 20. The torque out of the epicyclic gear train 20, 18, 19 at the planet wheel shaft(s) 17 (17') is (E+1) times the sun gear torque, where E is the gear train ratio (annulus or ring wheel 19 teeth number divided by the sun wheel 20 teeth number). This ratio is typically between two and four, which is a considerable augmentation. Looking at it the other way, a considerable reduction is achieved in braking effort required for a given torque transfer.

Object c)

If the housing 2 and the second output shaft 14 are held stationary, and the first output shaft 11 is rotated, then the side wheel 10 will rotate relative to the housing 2 at the same speed as output shaft 11 (but in the opposite direction) along with shaft(s) 17 of planet wheel(s) 18. Since planet wheel(s) 18 are part of the epicyclic gear train B with annulus 19 fixed to the housing 2, the rotational speed of sun wheel 20 is (E+1) times the speed of side wheel 10; i.e., (E+1) times the speed difference between output shafts 11 and 14. The same action takes place in the equivalent construction of FIG. 2.

Summing up, the differential gear according to the present invention reduces the brake control torque by a factor (E+1) and increases the speed of the member being braked by the same factor, both having highly beneficial effects.

I claim:

1. A differential gear comprising a differential gear housing driveable for rotation, a first output shaft operatively connected to a first gear element and a second output shaft operatively connected to a second gear element of a differential planet gear train disposed within the differential gear housing, said differential planet gear train having further gear elements attached to the differential gear housing, and a planet gear train disposed within the differential gear housing and having a ring gear attached to the differential gear housing, at least one planet wheel carried by said second gear element and being operatively connected to the ring gear and to a sun wheel operatively connected to the planet wheel, said sun wheel being connected to a hollow shaft having the second output shaft disposed therein, brake means being disposed between the differential gear housing and said hollow shaft for braking relative rotation between the differential gear housing and the hollow shaft and being operable in response to a difference in rotational speed between the first and the second output shaft, said brake means includes a brake mechanism and a fluid pump having a first member rotating with the hollow shaft and a second member rotatable relative to the first member, relative rotation between said first and second members depending on relative rotation between the hollow shaft and the housing, and an outlet of the pump being connected to flow restricting means including fixed orifice means and externally adjustable valve means for controlling output of the pump, said output controlling brake action of said brake means.

2. A differential gear according to claim 1, wherein the pump is operative to provide fluid flow through he outlet irrespective of relative rotational directions of the rotational members of the pump.

3. A differential gear according to claim 1, wherein the brake mechanism is adapted to apply a braking torque to the hollow shaft at a radial distance therefrom.

4. A differential gear according to claim 1, wherein the pump is in fluid communication with a fluid cylinder provided in the housing, a piston being slidingly movable within the cylinder to operate the brake mechanism.

5. A differential gear according to claim 4, wherein the brake mechanism includes at least one brake disc fixedly attached to the hollow shaft and at least one cooperating braking member torsionally attached to the housing, the piston acting on said at least one braking member.

6. A differential gear according to claim 4, wherein said fixed orifice means comprises an orifice provided through said piston.

7. A differential gear according to claim 4, wherein said externally adjustable valve means is adapted to control a flow past the piston.

* * * * *